(12) United States Patent
Ishii

(10) Patent No.: US 8,014,559 B2
(45) Date of Patent: Sep. 6, 2011

(54) INFORMATION EMBEDDING APPARATUS, INFORMATION EMBEDDING METHOD, INFORMATION EXTRACTING APPARATUS, INFORMATION EXTRACTING METHOD, COMPUTER PROGRAM PRODUCT

(75) Inventor: Masaki Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1208 days.

(21) Appl. No.: 11/724,973

(22) Filed: Mar. 16, 2007

(65) Prior Publication Data

US 2007/0217651 A1 Sep. 20, 2007

(30) Foreign Application Priority Data

Mar. 16, 2006 (JP) .................................. 2006-073359
Mar. 8, 2007 (JP) .................................. 2007-059002

(51) Int. Cl.
*G06K 9/00* (2006.01)

(52) U.S. Cl. ........ 382/100; 382/181; 382/209; 382/232; 382/276; 382/298; 283/93; 283/113; 358/3.28

(58) Field of Classification Search .................. 382/100, 382/181, 209, 232, 276, 298, 299; 358/3.28; 380/200; 283/93, 113
See application file for complete search history.

(56) References Cited

U.S. PATENT DOCUMENTS

| | | | | |
|---|---|---|---|---|
| 5,793,902 A | * | 8/1998 | Watanabe et al. | 382/298 |
| 2001/0030761 A1 | * | 10/2001 | Ideyama | 358/1.9 |
| 2003/0002711 A1 | * | 1/2003 | Cordery et al. | 382/101 |
| 2005/0078331 A1 | * | 4/2005 | Guan et al. | 358/1.14 |
| 2005/0152006 A1 | * | 7/2005 | Abe et al. | 358/3.28 |

FOREIGN PATENT DOCUMENTS

| | | | |
|---|---|---|---|
| EP | 1619873 A1 | * | 1/2006 |
| EP | 1628466 A1 | * | 2/2006 |
| JP | 06-231466 | | 8/1994 |
| JP | 2003-101762 | | 4/2003 |
| JP | 2003-283797 | | 10/2003 |
| JP | 2004-080136 | | 3/2004 |
| JP | 2004-336219 | | 11/2004 |
| JP | 2005-094326 | | 4/2005 |
| JP | 2006-238119 | | 9/2006 |

* cited by examiner

*Primary Examiner* — Jingge Wu
*Assistant Examiner* — Julian Brooks
(74) *Attorney, Agent, or Firm* — Blakely, Sokoloff, Taylor & Zafman LLP

(57) ABSTRACT

A first-information obtaining unit that obtains first information and a second-information obtaining unit obtains second information. The second information has a higher degree of importance than that of the first information. A generating unit generates watermark image data including a group of first dot patterns including the first information and a group of second dot patterns including the first information and the second information and having a dot size enlarged from a dot size of the first dot patterns. A superposing unit superposes the generated watermark image data on a target image data.

20 Claims, 10 Drawing Sheets

BIT 0

BIT 1

FIG.7
FIG.8
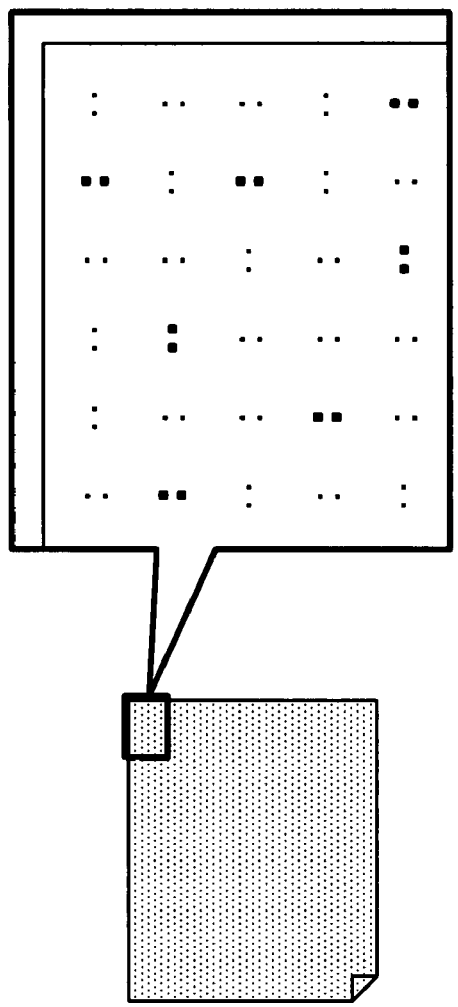
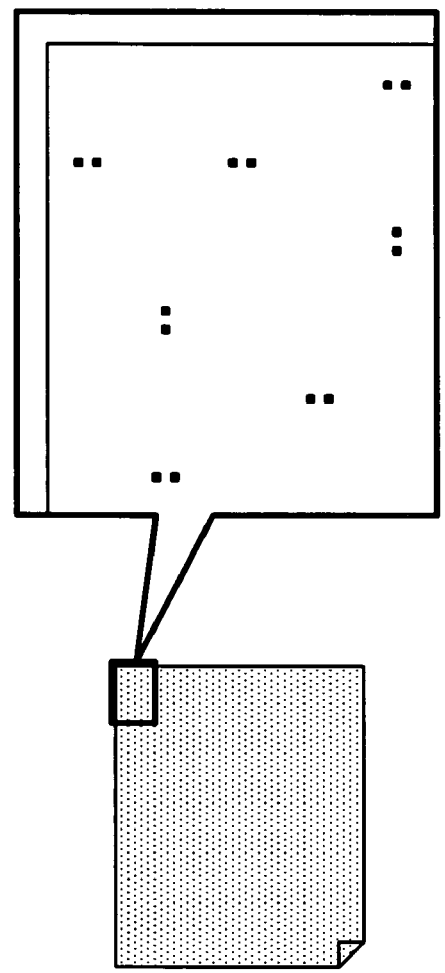

BIT 0

BIT 1

INFORMATION EMBEDDING APPARATUS, INFORMATION EMBEDDING METHOD, INFORMATION EXTRACTING APPARATUS, INFORMATION EXTRACTING METHOD, COMPUTER PROGRAM PRODUCT

PRIORITY

The present application claims priority to and incorporates by reference the entire contents of Japanese priority documents, 2006-073359 filed in Japan on Mar. 16, 2006 and 2007-59002 filed in Japan on Mar. 8, 2007.

BACKGROUND OF THE INVENTION

1. Field of the Invention

The present invention relates to a technology of embedding a plurality of types of information with different degrees of importance in image information.

2. Description of the Related Art

In recent years, electronic watermarking technology has been developed in which information for preventing tampering and copying is embedded in image data and document data. Also, several technologies have been suggested in which the electronic watermarking technology is applied for embedment in a document output as a paper medium in a format that is not visually noticeable by the user.

For example, Japanese Patent Application Laid-Open No. 2003-101762 suggests a technology of embedding secret information by disposing dot patterns.

With the use of such a technology, it is possible to embed in a paper document security information for preventing forgery and tampering on a print document, electronic information representing the contents written in a print document, Uniform Resource Locator (URL) information indicative of a web site for guiding the contents regarding the print document, and others. With this, a new added value can be provided to a print document.

Meanwhile, as a technology of adding some information to the background of a paper document in a manner similar to the above, a technology of adding tint blocks has been known. In this technology, the limit of the image reproduction capability of an image processing apparatus is used to cause some character or the like to appear when a paper document is copied.

For example, Japanese Patent Application Laid-Open No. 2005-094326 suggests a technology of generating a tint block image at high speed in a memory-saving manner and then superposing the tint block image on the background of a document.

As disclosed in Japanese Patent Application Laid-Open No. 2005-094326, the background portion is written with fine dots or the line exceeding the limit of the image representation capability is lost at the time of copying. That is, even if a large amount of information is written, a dot size that allows copying (that is, copy-tolerant dot size) has a limitation.

In the technology disclosed in Japanese Patent Application Laid-Open No. 2003-101762, however, if a large amount of information is embedded with copy tolerance, a large amount of dots of a predetermined size are added, thereby posing a problem that the appearance of the printed print document is deteriorated.

SUMMARY OF THE INVENTION

An information embedding apparatus, information embedding method, information extracting apparatus, information extracting method, computer program product are described. An information embedding apparatus comprising: an image obtaining unit that obtains image information; a first-information obtaining unit that obtains first information to be embedded in the image information obtained by the image obtaining unit; a second-information obtaining unit that obtains second information to be embedded in the image information obtained by the image obtaining unit, where the second information has a higher degree of importance than that of the first information; a generating unit that generates watermark image information including a group of first image patterns including the first information and representing one bit or a plurality of bits and a group of second image patterns including the second information by using a dot size enlarged from the first image patterns; and a superposing unit that superposes the watermark image information on the image information obtained by the image obtaining unit thereby obtaining watermark-superposed image information.

BRIEF DESCRIPTION OF THE DRAWINGS

FIG. 7 is a drawing of an example of watermark image data extracted from a watermark image extracting unit of the information extracting apparatus according to the embodiment, with dot patterns of a fine size not removed therefrom;

FIG. 8 is a drawing of an example of watermark image data extracted from the watermark image extracting unit of the information extracting apparatus according to the embodiment, with dot patterns of a fine size removed therefrom;

DETAILED DESCRIPTION OF THE PREFERRED EMBODIMENTS

Figure 1:
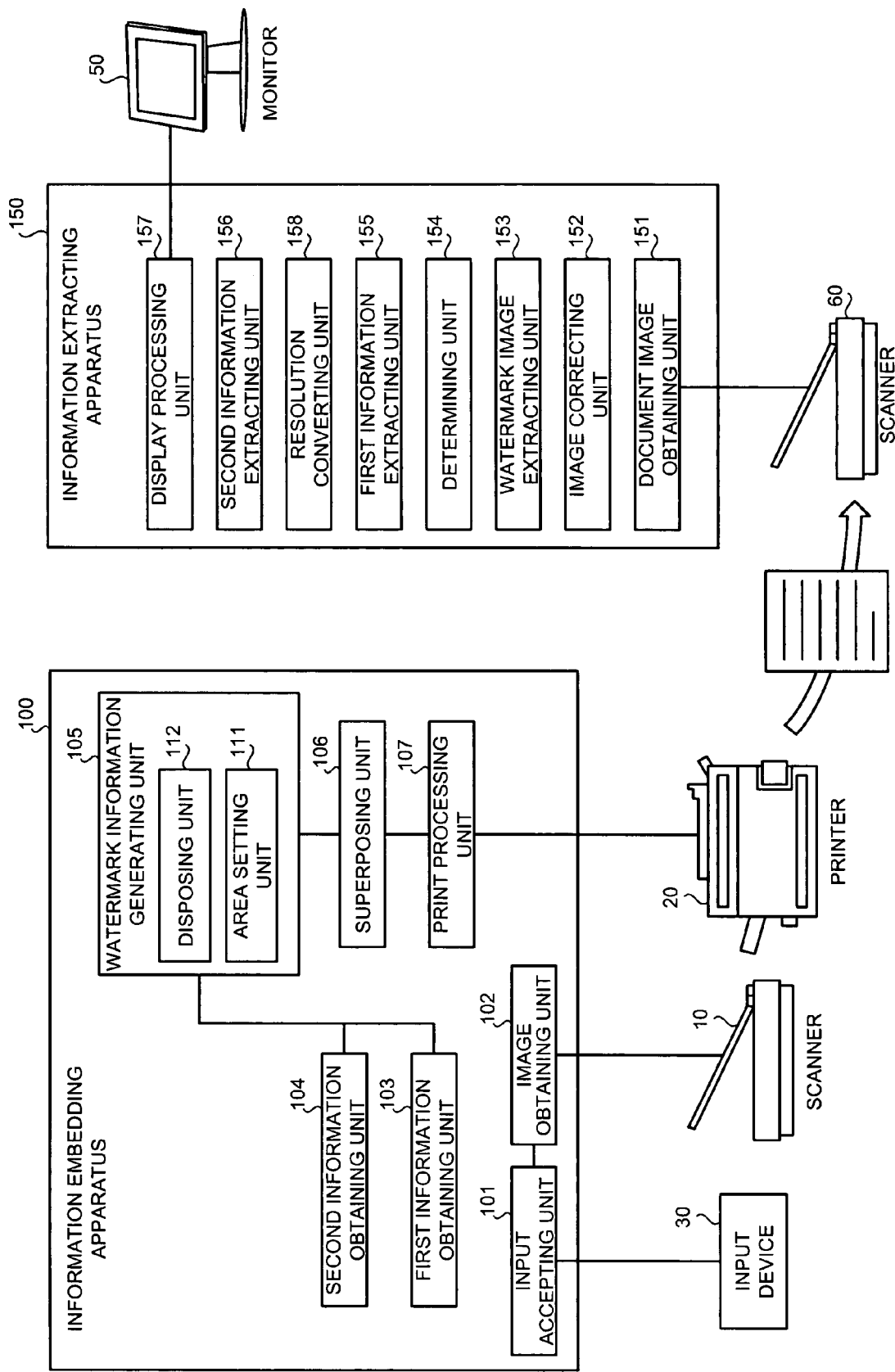
FIG. 1 is a block diagram of the configuration of an information embedding apparatus and an information extracting apparatus according to an embodiment.

According to an embodiment of the present invention, an information embedding apparatus includes an image obtaining unit that obtains image information; a first-information obtaining unit that obtains first information to be embedded in the image information obtained by the image obtaining unit; a second-information obtaining unit that obtains second information to be embedded in the image information obtained by the image obtaining unit, where the second information has a higher degree of importance than that of the first information; a generating unit that generates watermark image information including a group of first image patterns including the first information and representing one bit or a plurality of bits and a group of second image patterns including the second information by using a dot size enlarged from the first image patterns; and a superposing unit that superposes the watermark image information on the image information obtained by the image obtaining unit thereby obtaining watermark-superposed image information.

According to another embodiment of the present invention, an information extracting apparatus includes an image obtaining unit that obtains watermark-superposed image information that is image information having superposed thereon watermark image information formed of a group of first image patterns representing one bit or a plurality of bits and a group for second image patterns with a dot size enlarged from a dot size of the first image patterns; a first-information extracting unit that extracts first information embedded in the watermark-superposed image information from the group of the first image patterns and the group of the second image patterns of the watermark-superposed image information; and a second-information extracting unit that extracts second information embedded in the watermark-superposed image information from the group of the second image patterns of the watermark-superposed image information.

According to still another embodiment of the present invention, a method for embedding information includes obtaining image information; obtaining first information to be embedded in obtained image information; obtaining second information to be embedded in the obtained image information, the second information having a higher degree of importance than that of the first information; generating watermark image information including a group of first image patterns including the first information and representing one bit or a plurality of bits and a group of second image patterns including the second information by using a dot size enlarged from the first image patterns; and superposing the watermark image information on the obtained image information thereby obtaining watermark-superposed image information.

According to still another embodiment of the present invention, a method of embedding information includes obtaining watermark-superposed image information that is image information having superposed thereon watermark image information formed of a group of first image patterns representing one bit or a plurality of bits and a group of second image patterns with a dot size enlarged from a dot size of the first image patterns; extracting first information embedded in the watermark-superposed image information from the group of the first image patterns and the group of the second image patterns of the watermark-superposed image information; and extracting second information embedded in the watermark-superposed image information from the group of the second image patterns of the watermark-superposed image information.

The above and other embodiments, features, advantages and technical and industrial significance of this invention will be better understood by reading the following detailed description of presently preferred embodiments of the invention, when considered in connection with the accompanying drawings.

Exemplary embodiments of the present invention are explained in detail below with reference to accompanying drawings.

FIG. 1 is a block diagram of the configuration of an information embedding apparatus 100 and an information extracting apparatus 150 according to an embodiment of the present invention. The information embedding apparatus 100 includes an input accepting unit 101, an image obtaining unit 102, a first information obtaining unit 103, a second information obtaining unit 104, a watermark information generating unit 105, a superposing unit 106, and a print processing unit 107. After watermark image data having first information and second information embedded therein is superposed on input document image data, and the resulting data is subjected to a printing process as a print document.

Also, the print document subjected to the printing process by the information embedding apparatus 100 is assumed to be a document with its background having the first information and the second information printed as a watermark (hereinafter, "watermark-added document").

The information to be superposed and embedded in the watermark image data includes several pieces of information with different degrees of importance. For example, if security information, source information, or copyright information for detecting tampering of the print document is superposed as a watermark, such information has to be able to be extracted from a paper document on which the print document is copied. That is, copy tolerance is required.

On the other hand, when a Uniform Resource Locator (URL) of a web site written with related information and electronic data representing the print document is superposed, information does not necessarily have to be able to be extracted from the paper document on which the print document is copied. That is, no copy tolerance is required. Moreover, such electronic data often contains a large amount of information.

To provide copy tolerance with the conventional information embedding method using a dot pattern, relatively large dots has to be used in order not to be lost by copying. Also, to embed all pieces of information as a watermark, a space between dots has to be small. That is, relatively large dots are densely disposed, thereby leading to a deterioration in quality of the print document.

To get around this problem, when pieces of information with different degrees of importance are embedded, fine dot patterns without copy tolerance and enlarged dot patterns with copy tolerance are used in the present embodiment. The concept of the present embodiment is such that, basically, first information is embedded with fine dot patterns, and these fine dot patterns are changed to dot patterns of enlarged dots without reducing the amount of the first information, thereby additionally embedding second information requiring copy tolerance.

That is, the first information is assumed to be information embedded in a print document and presenting no problem if it cannot be extracted. Examples of the first information include electronic data representing a document written in a print document and a URL of a web site having written therein the contents related to a document written in a print document.

The second information is assumed to be information embedded in a print document and desired to be reliably extracted. In the present embodiment, the second information is assumed to information with a degree of importance higher than the degree of importance of the first information, which will be explained further below. Examples of the second information include copyright information of a document written in a print document and security information for use in detecting tampering.

Here, the first information and the second information may include input information entered by a user through the input accepting unit 101, which will be explained below.

The input accepting unit 101 accepts input information entered by the user operating an input device 30. Examples of the input information include document data to be printed as a watermark-added document or information included in the first information or the second information.

The image obtaining unit 102 obtains document image data to be printed as a watermark-added document. It is assumed that the document image data means data on which a watermark is superposed by the information embedding apparatus 100 and includes data in an image format, such as Joint Photographic Experts Group (JPEG) or Tagged Image File Format (TIFF), a Portable Document Format (PDF) file document data generated through a document generating application, and others. Also, the source of the document image data is not restrictive, and may be a scanner 10, an electronic document generated with an input from a user's input device, image data entered through a network, or others.

Figure 2:
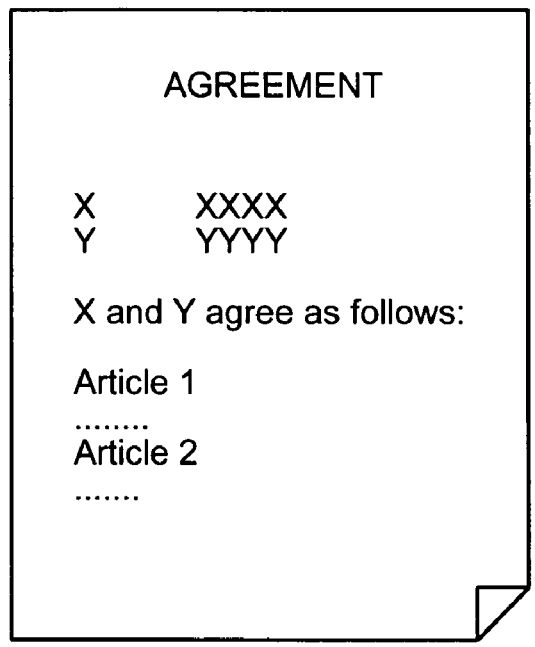
FIG. 2 is a drawing illustrating an example of document image data to be printed.

FIG. 2 is a drawing illustrating an example of document image data to be printed. As depicted in the drawing, the document image data on which a watermark image is superposed in the present embodiment is assumed to be image data having a document written therein.

Referring back to FIG. 1, the first information obtaining unit 103 obtains information to be embedded as first information. The first information obtaining unit 103 also obtains, for example, URL information included in the input information accepted by the input accepting unit 101. Furthermore, the first information obtaining unit 103 may obtain text information representing a document included in the document image data. In this case, an Optical Character Reader (OCR) or the like may be used.

The second information obtaining unit 104 obtains information to be embedded as second information. The second information obtaining unit 104 also obtains, for example, author or copyright information included in the input information accepted by the input accepting unit 101. In addition, the second information obtaining unit 104 obtains information for detecting tampering of a document included in the document image data. Examples of the information for detecting tampering include money amount information indicated in the document image data.

Other examples of the information to be obtained by the first information obtaining unit 103 and the second information obtaining unit 104 include information read from a storage device of a Hard Disk Drive (HDD) not shown and information entered through a network (for example, timestamp information). As a matter of course, a place from which the first information is obtained and a place from which the second information is obtained may be same or different from each other.

The watermark information generating unit 105 includes an area setting unit 111 and a disposing unit 112, and generates watermark image data identical in size to the document image data to be printed.

The area setting unit 111 divides a display area for the watermark image data in a predetermined size, and these divided areas are set as embedding blocks.

The area setting unit 111 sets an aggregated block in which embedding blocks obtained through division in the predetermined size are combined 3×3.

The disposing unit 112 disposes dot patterns representing the first information and the second information on the respective embedding blocks set by the area setting unit 111.

The outline of the watermark image data generated by the watermark information generating unit 105 according to the present embodiment is explained. Here, for simplification of explanation below, the procedure goes in a manner such that after a dot pattern of fine dots for embedding the first information is disposed, the dot pattern is changed to a dot pattern of enlarged dots for further embedding the second information. In practice, however, the information embedding apparatus 100 disposes the respective dot patterns at one disposing process.

Figure 3A:
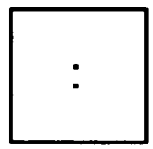
FIG. 3A is a drawing of an example of 0 bit in a dot pattern for embedding first information.
Figure 3B:
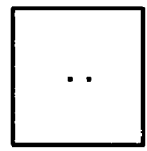
FIG. 3B a drawing of an example of 1 bit in a dot pattern for embedding the first information.

Next, the dot pattern for embedding the first information is explained. FIG. 3A is a drawing of an example of the dot pattern of fine dots representing a "0" bit. FIG. 3B is a drawing of an example of the dot pattern of fine dots representing a "1" bit. Either of these dot patterns is disposed on each embedding block.

That is, after the area setting unit 111 sets embedding blocks on which dot patterns are disposed and aggregated blocks, the disposing unit 112 converts the first information to binary data formed of 0 bit and 1 bit and then disposes a dot pattern on each of the set embedding blocks.

Figure 4:
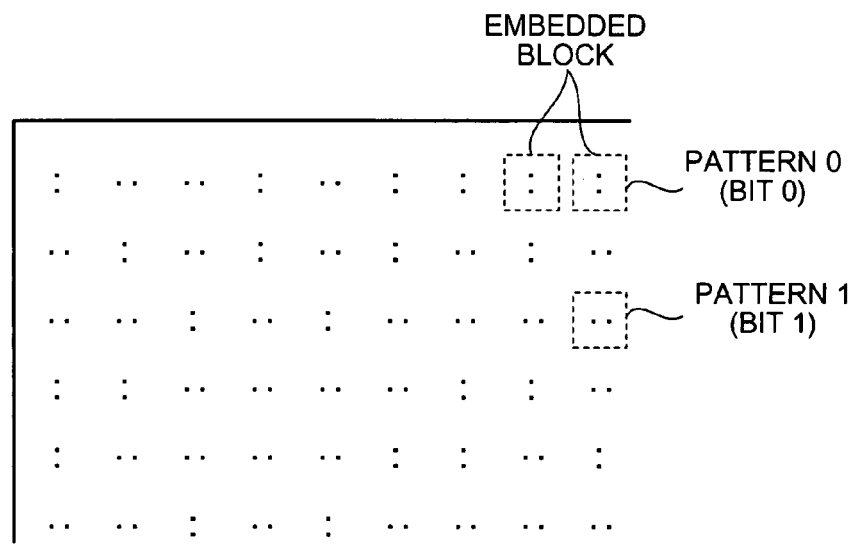
FIG. 4 is a drawing of a disposition example of dot patterns of fine dots representing the first information disposed by a disposing unit of the information embedding apparatus according to the embodiment.

FIG. 4 is a drawing of a disposition example of dot patterns of fine dots representing the first information disposed by the disposing unit 112. As depicted in the drawing, for the first information, the disposing unit 112 disposes either of the two types of dot patterns formed of fine dots on each of the embedding blocks set by the area setting unit 111 (to form a lattice in the present embodiment). Since these dot patterns have a fine size, a large amount of information can be embedded. That is, the dot patterns of fine dots represent a first image pattern, in other words.

Next, dot patterns disposed by the disposing unit 112 in which the second information is embedded are explained. Firstly, it is assumed herein that, for each aggregated block set by the area setting unit 111, one bit of the second information is embedded. As a scheme for embedding this second information, a scheme of changing a dot pattern at a predetermined position from among the dot patterns of fine dots included in an aggregated block to a dot pattern of an enlarged dot size.

Here, the actual size of the fine dot pattern and the dot pattern of the enlarged dots are set based on the limit of the image reproduction capability of an image forming apparatus. That is, a dot smaller than the limit of the image reproduction capability is set as a fine bit, whilst a dot larger than the limit of the image reproduction capability is set as an enlarged dot. Here, specific sizes of these dots are well known from a technology of generating a tint block image and other technologies, and therefore are not explained herein.

Figure 5:
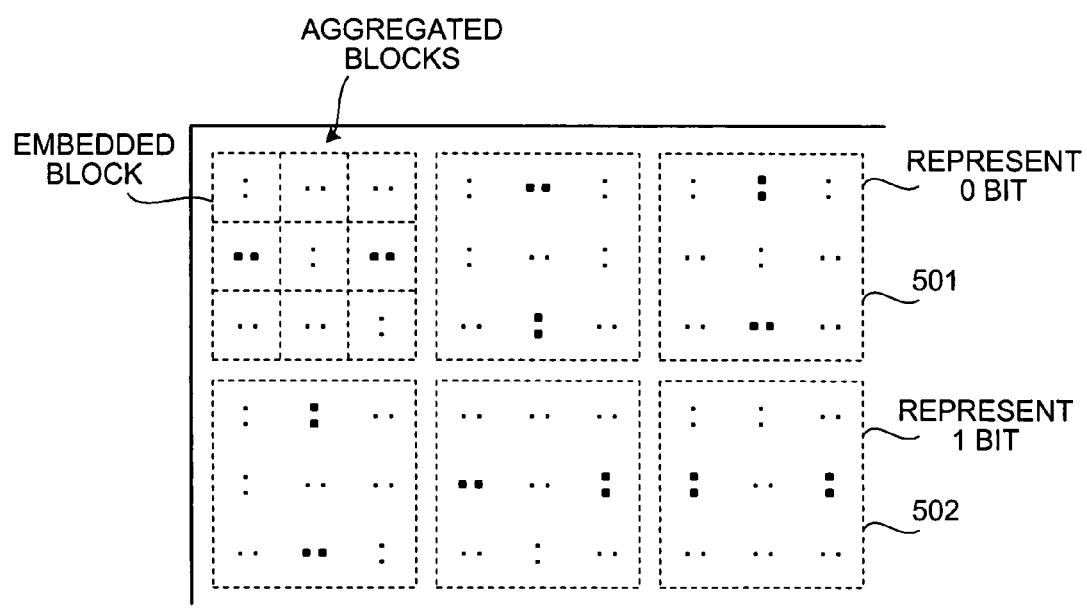
FIG. 5 is a drawing of a disposition example of dot patterns of fine dots and enlarged dots disposed by the disposing unit of the information embedding apparatus according to the embodiment.

FIG. 5 is a drawing of a disposition example of dot patterns of fine dots and enlarged dots disposed by the disposing unit 112. As depicted in the drawing, for each aggregated block, the "0" bit and the "1" bit (that is, a unit of 1 bit) of the second information are represented with two enlarged dot patterns vertically aligned or with two enlarged dot patterns horizontally aligned. Specifically, an aggregated block 501 represents a "0" bit, whilst an aggregated block 502 represents a "1" bit. That is, in the present embodiment, as a rule of including the second information, among 3×3 embedding blocks, an upper-center embedding block and a lower-center embedding block in an aggregated block each contain a dot pattern of enlarged dots for representing "0" bit, whilst an center-left embedding block and a center-right embedding block in an aggregated block each contain a dot pattern of enlarged dots for representing a "1" bit.

With this, the disposing unit 112 can embed the second information as binary data without reducing the amount of the first information. Also, the disposing unit 112 disposes dot patterns of large dots for embedding the second information, and therefore copy tolerance can be provided. In other words, the dot patterns of large dots represent the first information and also allow the second information to be embedded, that is, represent a second image pattern.

In this manner, one bit is embedded for each embedding block for the first information, whilst one bit is embedded for each aggregated block for the second information. Therefore, the amount of information embeddable as the second information is smaller than the amount of information embeddable as the first information. In the example of FIG. 5, the amount of information embeddable as the second information is approximately one ninth of the amount of information embeddable as the first information.

The superposing unit 106 superposes as a background the watermark image data generated through the process explained above on the document image data to be printed.

Figure 6:
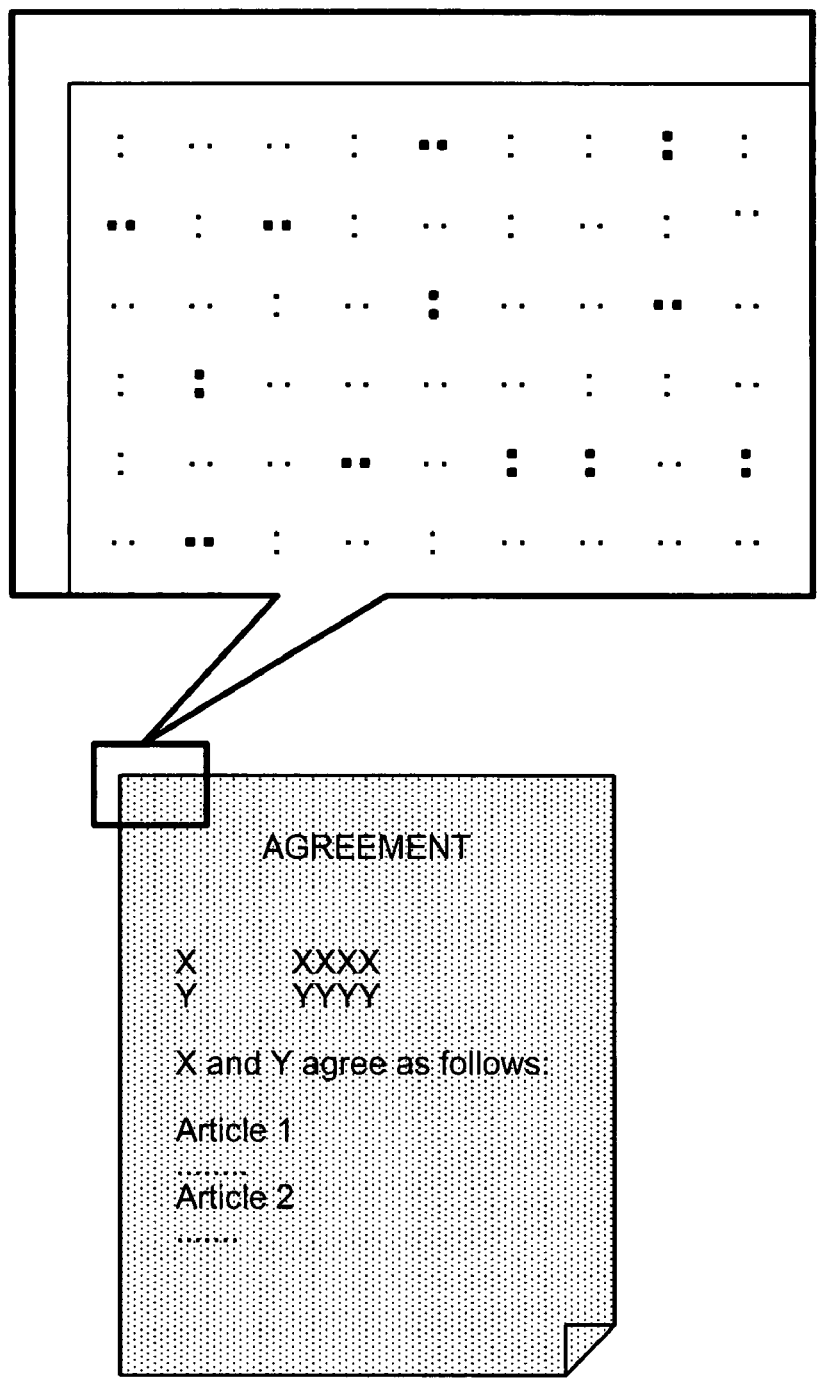
FIG. 6 is a drawing of an example of document image data with a watermark superposed thereon by a superposing unit of the information embedding apparatus according to the embodiment.

FIG. 6 is a drawing of an example of document image data with a watermark superposed thereon by the superposing unit 106. As depicted in the drawing, a watermark that includes the first information and the second information is superposed on document image data having a document written therein. The information extracting apparatus 150, which will be explained further below, can extract the second information and others from the background of the watermark-added document image data.

Referring back to FIG. 1, the print processing unit 107 performs a printing process on the document image data with the watermark superposed thereon by the superposing unit 106.

With such a configuration, the information embedding apparatus 100 allows the second information to be embedded in the watermark-added document image data with high copy tolerance, and also allows a large amount of first information to be embedded.

The information extracting apparatus 150 includes a document image obtaining unit 151, an image correcting unit 152, a watermark image extracting unit 153, a determining unit 154, a first information extracting unit 155, a second information extracting unit 156, a display processing unit 157, and a resolution converting unit 158. After watermark-added document image data printed by the information embedding apparatus 100 is read, the embedded information is extracted to be displayed on a monitor 50 together with the document image data.

The document image obtaining unit 151 obtains the watermark-added document image data through a scanner 60. A scheme of obtaining the watermark-added document image data is not restricted to be the one through the scanner 60. For example, the watermark-added document image data may be obtained through a public network.

The image correcting unit 152 corrects the obtained watermark-added document image data. For example, since the image data read by the scanner 60 may generally have noise or distortion, the image correcting unit 152 performs correction suitable for processing explained further below.

The watermark image extracting unit 153 separates the background portion from the watermark-added document image data to extract watermark image data. With such a process, the document image data without addition of watermark image data can be obtained.

At this time, any known data recovery scheme may be used in an area where dot patterns of the background and characters written in the document are superposed upon each other.

The determining unit 154 determines whether the first information can be extracted from the extracted watermark image data. This is determined by determining whether the dot patterns of the fine dot size explained above can be read from the obtained watermark image data. For example, if the original document image data of the extracted watermark image data has been previously copied and the dot patterns of the fine dot size has been deleted through a background process at the time of copying, the determining unit 154 determines that the dot patterns cannot be read. Here, in the present embodiment, different subsequent processes are performed depending on the difference in determination.

Here, since the second information is never deleted through a background process or the like, the second information can be extracted irrespectively of the determination by the determining unit 154.

When the determining unit 154 determines that the first information can be extracted, the first information extracting unit 155 extracts the first information from dot patterns of fine dots and dot patterns of enlarged dots in the watermark image data. Additional information about extracting the first information is described in the Japanese Patent Application No. 2005-050593, filed on Feb. 25, 2005, which is incorporated herein by reference. Here, with the second information being embedded, fine dots and enlarged dots are mixed. As for the dot patterns of enlarged dots, for example, a scheme such as template matching may be used. With such a process, the first information extracting unit 155 can extract the first information.

The second information extracting unit 156 extracts the second information though different processes depending on the determination by the determining unit 154 as to whether the first information can be extracted. These processes are explained below.

Firstly, the case is explained where the second information extracting unit 156 extracts the second information from the watermark image data from which the dot patterns of a fine size representing only the first information is not lost.

FIG. 7 is a drawing of an example of the watermark image data from which the dot patterns of the fine size is not removed. As depicted in the drawing, in the watermark image data, dot patterns of fine dots and dot patterns of enlarged dots are written.

The second information extracting unit 156 then uses a scheme, such as template matching, to specify embedding block positions explained above. The second information extracting unit 156 then unifies the specified 3×3 embedding blocks to specify an aggregated block.

The second information extracting unit 156 then extracts bit information of the second information from each aggregated block. Specifically, the second information extracting unit 156 determines which embedding block of the aggregated block has the dot size of the enlarged dots, thereby extracting the bit information of the second information.

Also, a determination by the second information extracting unit 156 as to whether the dot size is large may be made by using any scheme, for example, by counting the number of black pixels in the embedding block.

With this, the second information extracting unit 156 can specify the positions of the embedding blocks where the dot patterns of the enlarged dot size are disposed, thereby obtaining the bit information of the second information.

Next, the case is explained where the second information extracting unit 156 extracts the second information from the watermark image data from which the dot patterns of a fine size representing only the first information is lost.

FIG. 8 is a drawing of an example of the watermark image data from which the dot patterns of the fine size is removed. As depicted in the drawing, in the watermark image data, only the dot patterns of enlarged dots are written. It is assumed in the present embodiment that, before the second information extracting unit 156 extracts the second information, the resolution converting unit 158 performs resolution conversion.

The resolution converting unit 158 converts the watermark image data to a predetermined resolution lower than the resolution of the original document image data.

Figure 9:
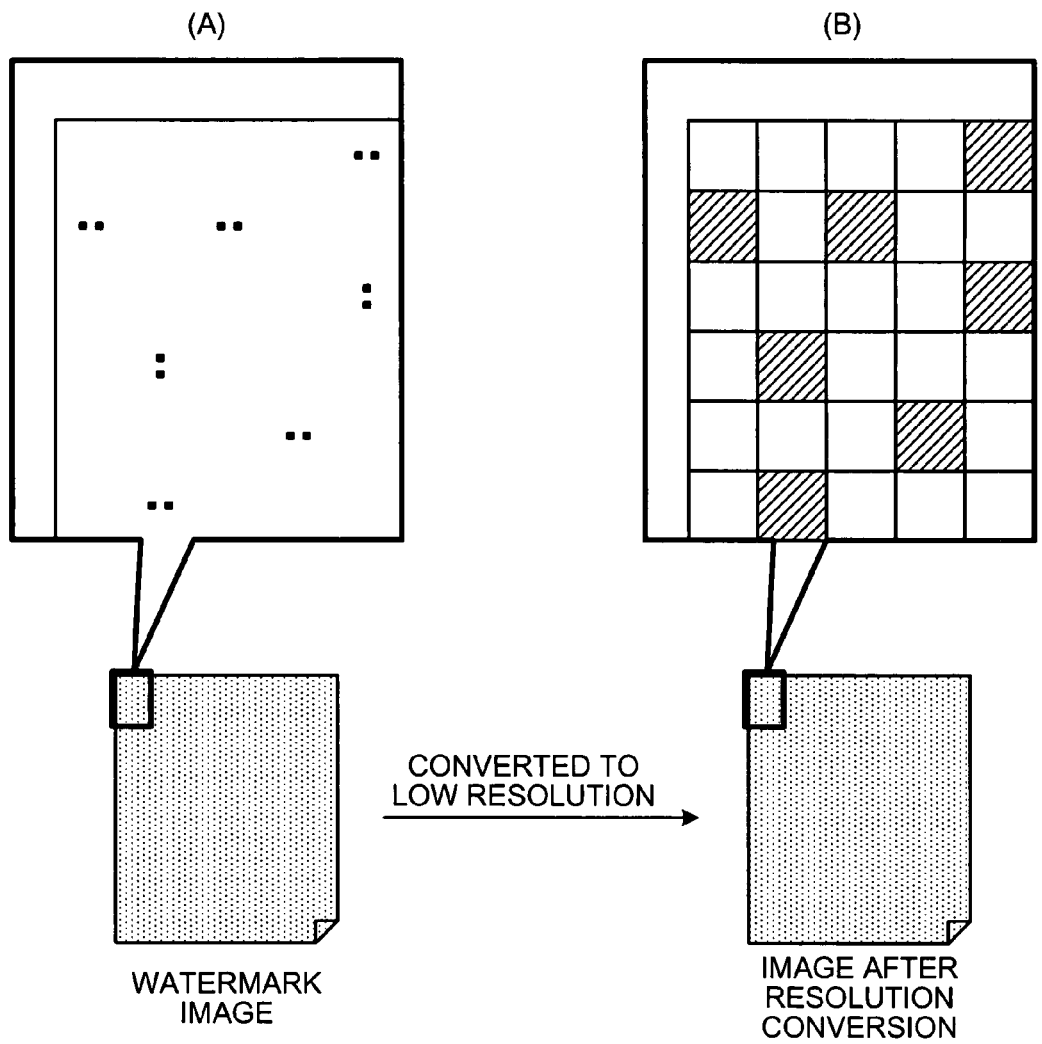
FIG. 9 is a drawing illustrating resolution conversion performed by a resolution converting unit of the information extracting apparatus according to the embodiment.

FIG. 9 is a drawing illustrating a process of conversion to the predetermined resolution performed by the resolution converting unit 158. In the drawing, (A) represents watermark image data before conversion, whilst (B) represents watermark image data after conversion. As depicted in the drawing, the predetermined resolution achieved through conversion by the resolution converting unit 158 is assumed to be a resolution with which the embedding block represents one dot. Here, although the predetermined resolution has such a value in the present embodiment, this is not meant to be restrictive, and the resolution may be arbitrary as long as template matching, which will be explained further below, is facilitated.

At this time, when the resolution converting unit 158 performs conversion to the predetermined resolution in a manner such that the embedding block is converted to a black dot when a plurality of black dots are present in the embedding block and the embedding block is converted to a white dot when no plurality of black dots are present therein. With this, the information extracting apparatus 150 according to the present embodiment can obtain image data with a low resolution depicted in (B) of FIG. 9.

The second information extracting unit 156 then extracts the second information from the watermark image data after resolution conversion by the resolution converting unit 158. When extracting the second information, the second information extracting unit 156 performs template matching.

Figure 10A:
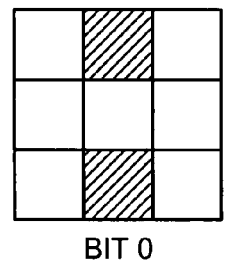
FIG. 10A is a drawing of a template representing a "0" bit for use in template matching by a second information extracting unit of the information extracting apparatus according to the embodiment.
Figure 10B:
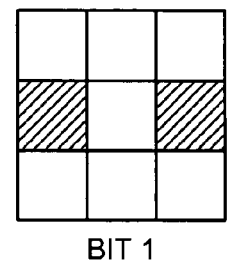
FIG. 10B is a drawing of a template representing a "1" bit for use in template matching by a second information extracting unit of the information extracting apparatus according to the embodiment.

FIGS. 10A and 10B are drawings of templates for use in template matching by the second information extracting unit 156. FIG. 10A depicts a template representing a "0" bit, whilst FIG. 10B depicts a template representing a "1" bit. With the second information extracting unit 156 performing a matching process on a block corresponding to the aggregated block using the templates above, the bit information of the second information can be obtained. Here, the templates depicted in FIGS. 10A and 10B correspond to a third image pattern, in other words.

Referring back to FIG. 1, the display processing unit 157 causes the contents of the document image data to be displayed on the monitor 50, and also causes copyright information or security information indicating whether tampering is present embedded as the second information to be displayed, for example. Also, if the first information can be extracted, in place of the document image data, the display processing unit 157 may cause the document having the contents of the document image data written therein to be displayed in an editable state.

Figure 11:
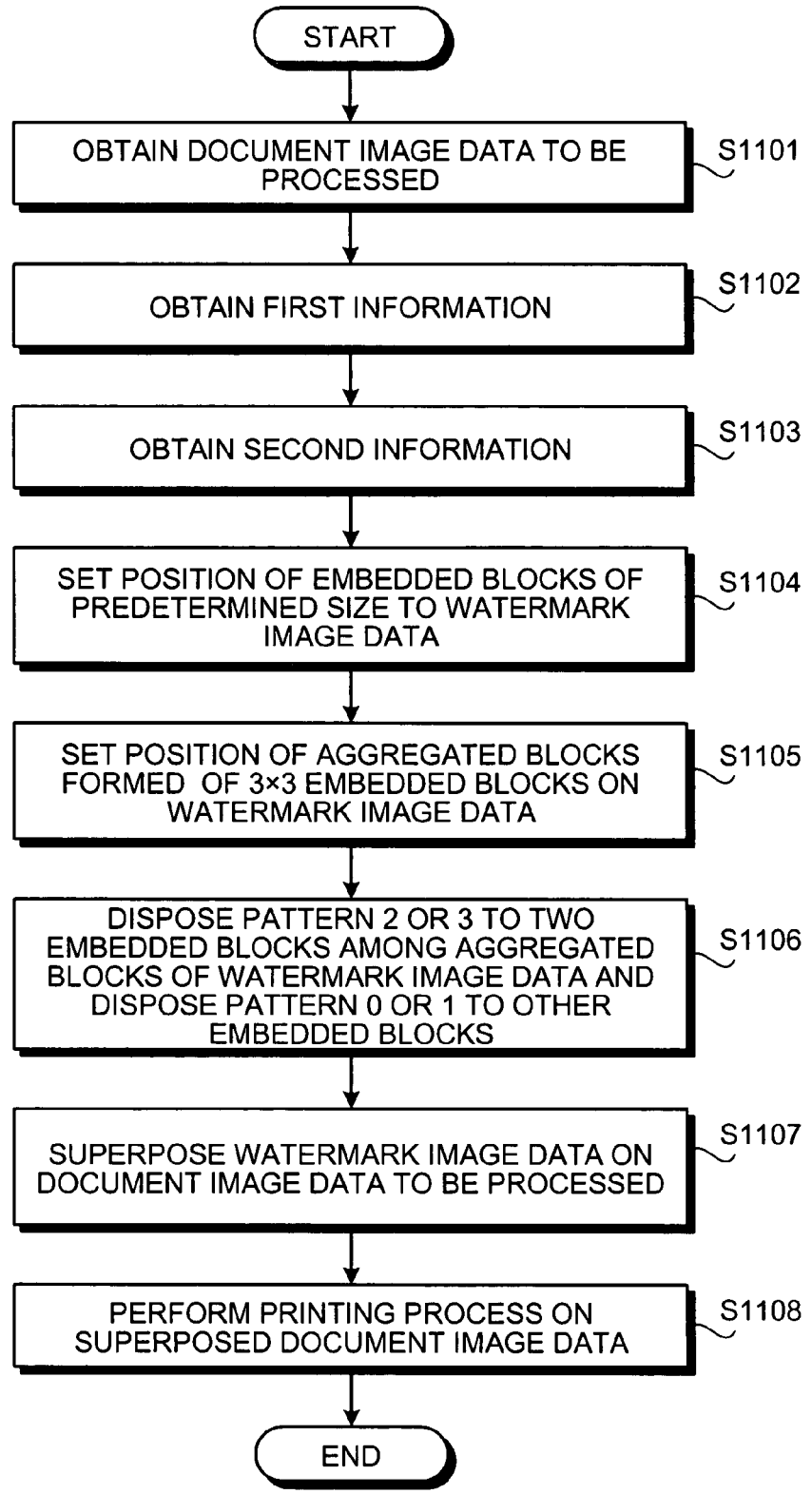
FIG. 11 is a flowchart of a procedure of processes from obtaining document image data at the information embedding apparatus according to the embodiment to printing the document image data with a watermark.

Next, processes from obtaining document image data to be processed to printing watermark-added document image data performed at the information embedding apparatus 100 according to the present embodiment are explained. FIG. 11 is a flowchart of a procedure of these processes mentioned above at the information embedding apparatus 100 according to the present embodiment.

Firstly, the image obtaining unit 102 obtains document image data to be processed through the scanner 10 or the like (step S1101).

Next, the first information obtaining unit 103 obtains the first information to be embedded (step S1102). The second information obtaining unit 104 then obtains the second information to be embedded (step S1103).

Next, the area setting unit 111 divides a display area where watermark image data is superposed on the obtained document image data into a predetermined size for setting positions of embedding blocks (step S1104).

The area setting unit 111 then sets positions of aggregated blocks each formed of 3×3 embedding blocks in the display area of the watermark image data (step S1105).

Next, the disposing unit 112 disposes a dot pattern 2 or 3 to two blocks, top and bottom or right and left, from among the embedding blocks included in each aggregated block and disposes a dot pattern 0 or 1 to the other embedding blocks (step S1106). It is assumed herein that the dot patterns 0 and 1 are dot patterns of a fine size depicted in FIGS. 3A and 3B. Also, it is assumed therein that the dot patterns 2 and 3 are those with dots being positioned in a manner identical to that of FIGS. 3A and 3B but their dot size being enlarged. The disposing unit 112 disposes these dot patterns for each embedding block. With this, the first information and the second information are embedded.

The superposing unit 106 then superposes the watermark image data with the dot patterns disposed for each embedding block on the document image data to be processed each other (step S1107).

Next, the print processing unit 107 performs a printing process from the printer 20 on the document image data with the watermark superposed thereon (step S1108).

With the procedure explained above, the user can obtain the document image data with the watermark added thereto. Here, the procedure explained above is merely an example from obtaining the document image data to be processed to printing the watermark-added image data according to the present embodiment, and is not meant to restrict the present invention.

Figure 12:
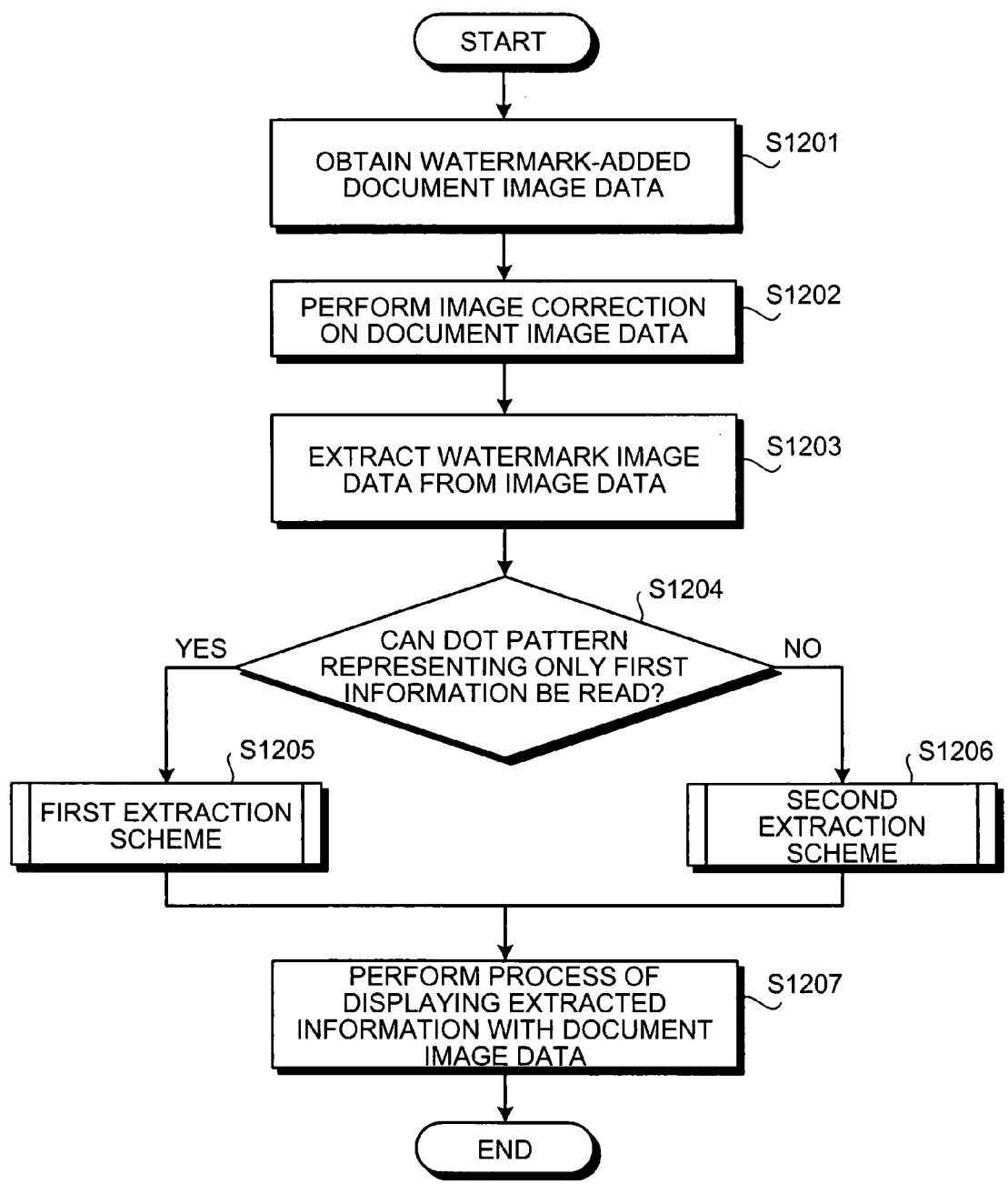
FIG. 12 is a flowchart of a procedure of processes from obtaining document image data at an information extracting apparatus 150 according to the embodiment to displaying the document image data and extracted information.

Next, processes from obtaining the document image data with the watermark added thereto to displaying the document image data and the extracted information at the information extracting apparatus 150 according to the present embodiment are explained. FIG. 12 is a flowchart of a procedure of these processes mentioned above at the information extracting apparatus 150 according to the present embodiment.

Firstly, the document image obtaining unit 151 obtains the watermark-added document image data through the scanner 60 or the like (step S1201).

Next, the image correcting unit 152 corrects the obtained watermark-added image data. With this, noise and distortion of the image often occurring when a print document on a paper medium is read to obtain document image data are corrected (step S1202).

The watermark image extracting unit 153 then extracts background watermark image data from the watermark-added document image data (step S1203). Here at this time, the document data with the background removed therefrom is also obtained.

Next, the determining unit 154 determines whether the dot patterns representing only the first information can be read from the extracted watermark image data (step S1204).

When the determining unit 154 determines that the dot patterns can be read ("Yes" at step S1204), the first information and the second information are extracted through a first extracting scheme (step S1205). The first extracting scheme will be discussed further below.

When the determining unit 154 determines that the dot patterns cannot be read ("No" at step S1204), only the second information is extracted through a second extracting scheme (step S1206). The second extracting scheme will be discussed further below.

The display processing unit 157 then performs a process of displaying the extracted information with the document image data (step S1207).

With the procedure explained above, the information embedded as a watermark can be confirmed. Here, the procedure explained above is merely an example from obtaining the watermark-added document image data to displaying the document image data according to the present embodiment, and is not meant to restrict the present invention.

Figure 13:
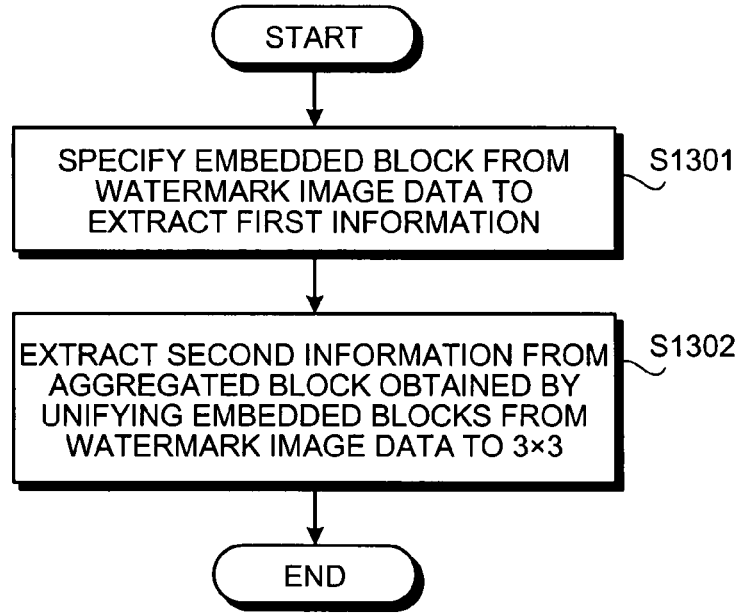
FIG. 13 is a flowchart of a procedure of processes when a first extracting scheme is used in which first information and second information are extracted at the information extracting apparatus 150 according to the embodiment.

Next, processes using the first extracting scheme of extracting the first information and the second information at the information extracting apparatus 150 according to the present embodiment are explained. FIG. 13 is a flowchart of a procedure of these processes mentioned above at the information extracting apparatus 150 according to the present embodiment.

Firstly, the first information extracting unit 155 specifies positions of embedding blocks from the extracted watermark image data, and obtains the bit information of the first information for each embedding blocks from the dot patterns explained above to extract the first information (step S1301).

Next, the second information extracting unit 156 unifies the embedding blocks specified by the first information extracting unit 155 to 3×3 to specify positions of aggregated blocks, and obtains the bit information of the second information for each aggregated block to extract the second information (step S1302).

With the procedure explained above, the first information and the second information can extracted from the watermark image data.

Figure 14:
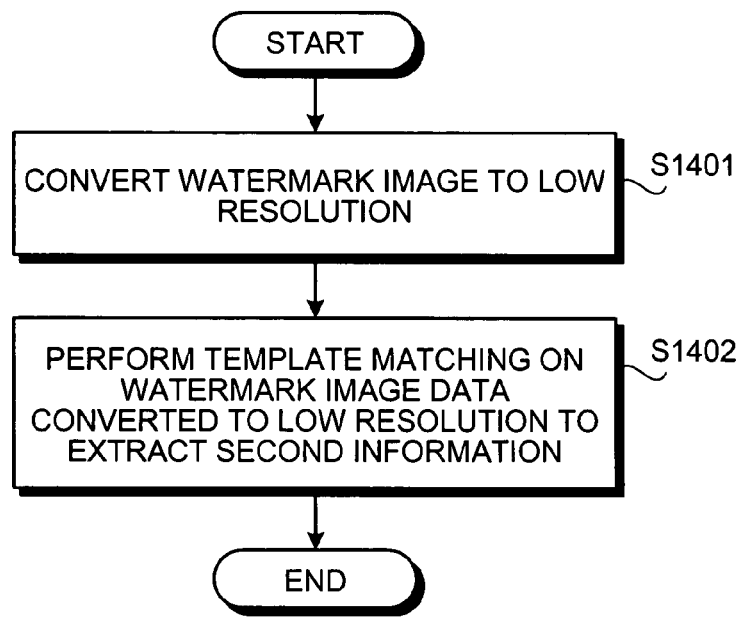
FIG. 14 is a flowchart of a procedure of processes when a second extracting scheme is used in which second information is extracted at the information extracting apparatus 150 according to the embodiment.

Next, processes using the second extracting scheme of extracting the second information at the information extracting apparatus 150 according to the present embodiment are explained. FIG. 14 is a flowchart of a procedure of these processes mentioned above at the information extracting apparatus 150 according to the present embodiment.

Firstly, the resolution converting unit 158 converts the extracted watermark image data to a low resolution (step S1401).

Next, the second information extracting unit 156 performs template matching on the watermark image data converted to a low resolution, and obtains the bit information of the second information for each aggregated block to extract the second information (step S1402).

With the procedure explained above, the second information can extracted from the watermark image data with the dot patterns of the fine dot size being removed therefrom.

In the present embodiment, the resolution converting unit 158 performs conversion to a low resolution. The reason is as follows. There are two dot patterns of enlarged dots representing the second information: ":" and "••". Also, in an aggregated block, embedding blocks on which the dot patterns of the second information may possibly be disposed are at four positions. Thus, if template matching is performed without resolution conversion, the number of image patterns that have to be used is the fourth power of 2, resulting in a long time for processing and computation. To get around this problem, the resolution converting unit 158 reduces the resolution of the watermark image data, thereby allowing template matching with two image patterns depicted in FIGS. 10A and 10B.

The information embedding apparatus 100 according to the present embodiment can embed a large amount of information with deterioration in appearance of a print document being suppressed, and also can provide copy tolerance.

Also, in the information embedding apparatus 100 according to the present embodiment explained above, the dot patterns are disposed on the watermark image data all at once. Alternatively, two processes may be performed in which the dot patterns of the first information are disposed first and then the dot size of the dot pattern at a predetermined position may be enlarged for embedding the second information. That is, any scheme may be used as long as the dot patterns representing only the first information and the dot patterns representing the first information and the second information can be disposed.

Furthermore, in the embodiment explained above, there are two types of dot disposition in dot pattern. Alternatively, the number of types may be further increased. With such a further increase in type, more information can be embedded in one block. Still further, the image pattern disposed on the image for superposing is not restricted to a dot pattern, but may be a line pattern, for example.

Here, in the present embodiment, as a rule for including the second information, the dot patterns of the predetermined embedding blocks from among 3×3 embedding blocks are represented by the dot patterns of enlarged dots. Such a disposition is not meant to be restrictive, and any rule may be used as long as embedding is performed on the enlarged dots with copy tolerance.

The present invention is not meant to be restricted to the embodiment explained above, and can be variously modified as exemplified below.

The functions of the information embedding apparatus 100 according to the present embodiment explained above can be applied to various apparatuses. Therefore, in a modification example, the case of a Multifunction Peripheral (MFP) including functions similar to those of the information embedding apparatus 100 is explained.

When a user copies a print document, the MFP outputs a print document with its background having a watermark added thereto. Here, processes to be performed is similar to those explained above, and therefore are not explained herein. In this manner, any apparatus may have the configuration explained in the embodiment.

Figure 15:
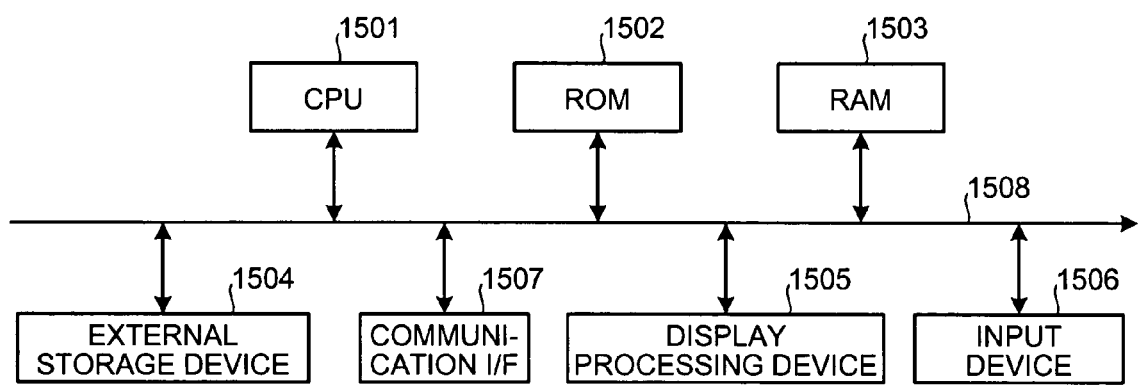
FIG. 15 is a drawing of a hardware configuration of a personal computer (PC) executing a program for achieving functions of the information embedding apparatus or the information extracting apparatus.

FIG. 15 is a drawing of a hardware configuration of a personal computer (PC) executing a program for achieving functions of the information embedding apparatus 100 or the information extracting apparatus 150. The PC achieving functions of the information embedding apparatus 100 or the information extracting apparatus 150 according to the present embodiment has a hardware configuration using a normal computer, including a control device such as a Central Processing unit 1501, storage devices such as a Read Only Memory 1502 and a Random Access Memory 1503, an external storage device 1504 such as a Hard Disk Drive (HDD) and Compact Disk (CD) drive device, a display processing device 1505 such as a display device, an input device 1506 such as a keyboard and a mouse, a communication interface (I/F) 1507, and a bus 1508 connecting these components together.

The information embedding program executed on the information embedding apparatus 100 or the information extracting program executed on the information extracting apparatus 150 according to the present embodiment is provided as a file in a installable or executable form and as being recorded on a computer-readable recording medium, such as a Compact Disk Read-Only Memory (CD-ROM), a flexible disk (FD), a compact disk recordable (CD-R), or a Digital Versatile Disk (DVD).

Also, the information embedding program executed on the information embedding apparatus 100 or the information extracting program executed on the information extracting apparatus 150 according to the present embodiment may be stored on a computer connected to a network, such as the Internet, and be downloaded via the network for provision. Also, the information embedding program executed on the information embedding apparatus 100 or the information extracting program executed on the information extracting apparatus 150 according to the present embodiment may be provided or distributed via a network, such as the Internet.

Furthermore, the information embedding program or the information extracting program according to the present embodiment may be provided as being incorporated in advance in a ROM or the like.

The information embedding program executed on the information embedding apparatus 100 according to the present embodiment has a module configuration including each of the components explained above (the input accepting unit, the image obtaining unit, the first information obtaining unit, the second information obtaining unit, the watermark information generating unit, the superposing unit, and the print processing unit). As actual hardware, the CPU reads the information embedding program from the recording medium for execution, thereby causing each of the components, that is, the input accepting unit, the image obtaining unit, the first information obtaining unit, the second information obtaining unit, the watermark information generating unit, the superposing unit, and the print processing unit, to be loaded and generated onto a main storage device.

The information extracting program executed on the information extracting apparatus 150 according to the present embodiment has a module configuration including each of the components explained above (the document image obtaining unit, the image correcting unit, the watermark image extracting unit, the determining unit, the first information extracting unit, the resolution converting unit, the second information extracting unit, and the display processing unit). As actual hardware, the CPU reads the information embedding program from the recording medium for execution, thereby causing each of the components, that is, the document image obtaining unit, the image correcting unit, the watermark image extracting unit, the determining unit, the first information extracting unit, the resolution converting unit, the second information extracting unit, and the display processing unit, to be loaded and generated onto a main storage device.

According to one embodiment of the present invention, the first image pattern and the second image pattern with different dot sizes are used to embed the first information and the second information in the watermark image information. With this, an effect can be achieved such that copy tolerance and embedment of a large amount of information can both be achieved with deterioration in appearance being prevented.

According to one embodiment of the present invention, since the second image pattern and the first image pattern are disposed according to a predetermined rule, appropriate embedded information can be generated. With this, an effect can be achieved such that copy tolerance and embedment of a large amount of information can both be achieved with deterioration in appearance being prevented.

According to an embodiment of the present invention, the dot pattern or the line pattern is used as the image pattern. With this, an effect can be achieved such that deterioration in appearance at the time of embedding the watermark information can be prevented.

According to another embodiment of the present invention, the second image pattern is left even if a background process is performed on the print document output from the information embedding apparatus. With this, an effect can be achieved such that copy tolerance with the second information retained can be provided.

According to still another embodiment of the present invention, the superposed image data is subjected to a printing process. With this, an effect can be achieved such that user convenience can be increased.

According to still another embodiment of the present invention, the image data is obtained by scanning a paper document. With this, an effect can be achieved such that watermark information can be embedded in an existing paper document.

According to still another embodiment of the present invention, the first information and the second information can be extracted from the image data having superposed thereon the watermark formed of the group of the first image patterns and the group of the second image patterns. With this, an effect can be achieved such that a large amount of information embedded in the image data can be extracted.

According to still another embodiment of the present invention, when the group of the first image patterns cannot be read, the first information is not extracted but the second information is extracted. Thus, even if the group of the first image patterns is removed through a background process or the like, the second information can always be extracted based on the group of the second image patterns with high copy tolerance. With this, an effect can be achieved such that important information can always be obtained.

According to still another embodiment of the present invention, an effect can be achieved such that the second information can be easily extracted with template matching.

According to still another embodiment of the present invention, the first information and the second information can be extracted. With this, an effect can be achieved such that a large amount of information embedded in the image data can be extracted.

According to still another embodiment of the present invention, the information embedding method can be achieved by using a computer caused to read the method for execution. With this, the effects similar to those explained above can be achieved.

According to still another embodiment of the present invention, the information extracting method can be achieved by using a computer caused to read the method for execution. With this, the effects similar to those explained above can be achieved.

According to still another embodiment of the present invention, a recording medium having stored therein either one of the information embedding program and the information extracting program is achieved. With this, an effect can be achieved such that the information embedding program or the information extracting program can be executed by causing a computer to read the recording medium.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information embedding apparatus comprising:
   an image obtaining unit to obtain image information;
   a first-information obtaining unit to obtain first information to be embedded in the image information obtained by the image obtaining unit;
   a second-information obtaining unit to obtain second information to be embedded in the image information obtained by the image obtaining unit, the second information having a higher degree of importance than that of the first information;
   a generating unit to generate watermark image information including a group of first image patterns and a group of second image patterns, each of which is arranged at each of a plurality of embedding areas, wherein each of the second image patterns is obtained by replacing dots corresponding to one of the first image patterns with dots having an enlarged size, the first image patterns and the second image patterns respectively represent one bit or a plurality of bits that constitute(s) the first information, and sets of the second image patterns respectively represent one bit or a plurality of bits that constitute(s) the second information in such a manner that a positional relationship between the second image patterns in each of the sets represents one bit or a plurality of bits; and
   a superposing unit to superpose the watermark image information on the image information obtained by the image obtaining unit thereby obtaining watermark-superposed image information, wherein
   the image obtaining unit, the first-information obtaining unit, the second-information obtaining unit, the generating unit, the superposing unit are embodied as a program residing on a non-transitory computer-readable medium.

2. The information embedding apparatus according to claim 1, wherein the generating unit includes:
   an area setting unit to set the embedding areas obtained by dividing a display area of the image information obtained by the image obtaining unit in a predetermined size and an aggregated area formed of a plurality of adjacent ones of the embedding areas; and
   a disposing unit to dispose the second image patterns on one or more of the embedding areas selected according to the second information from the embedding areas forming each of the aggregated areas set by the area setting unit and dispose the first image pattern on one or more of the embedding areas not selected.

3. The information embedding apparatus according to claim 1, wherein the generating unit generates the watermark image information having the group of first image patterns and the group of the second image patterns in a plurality of types of dot pattern or line pattern.

4. The information embedding apparatus according to claim 1, wherein the generating unit generates the watermark image information having the group of first image patterns displayed in a dot size smaller than a dot size of a limit of an image reproduction capability of an image processing apparatus and the group of second image patterns displayed in a dot size larger than the dot size of the limit of the image reproduction capability of the image processing apparatus.

5. An information extracting apparatus comprising:
   an image obtaining unit to obtain watermark-superposed image information that is image information having superposed thereon watermark image information formed of a group of first image patterns and a group of second image patterns, each of which is arranged at each of a plurality of embedding areas, wherein each of the second image patterns is obtained by replacing dots corresponding to one of the first image patterns with dots having an enlarged size, the first image patterns and the second image patterns respectively represent one bit or a plurality of bits that constitute(s) first information, and sets of the second image patterns respectively represent one bit or a plurality of bits that constitute(s) second information in such manner that a positional relationship between the second image patterns in each of the sets represents one bit or a plurality of bits;
   a first-information extracting unit to extract the first information embedded in the watermark-superposed image information based on the group of the first image patterns and the group of the second image patterns identified from the watermark-superposed image information; and
   a second-information extracting unit to extract second information embedded in the watermark-superposed image information based on the positional relationships between the second image patterns identified from the watermark-superposed image information, wherein
   the image obtaining unit, the first-information extracting unit, the second-information extracting unit are embodied as a program residing on a non-transitory computer-readable medium.

6. The information extracting apparatus according to claim 5, further comprising a determining unit that is embodied as a program residing on a non-transitory computer-readable medium and determines whether the group of the first image patterns can be read from the watermark-superposed image information, wherein
   the first-information extracting unit does not extract the first information when it is determined by the determining unit that the group of the first image patterns cannot be read.

7. The information extracting apparatus according to claim 6, further comprising a resolution converting unit that is embodied as a program residing on a non-transitory computer-readable medium and converts the watermark-superposed image information to a predetermined resolution lower than a resolution of the image information, wherein
   the second-information extracting unit extracts the second information by performing template matching on the image information converted to the predetermined resolution by the resolution converting unit to identify the positional relationships between the second image patterns.

8. The information extracting apparatus according to claim 7, wherein
   the first-information extracting unit extracts the first information when it is determined by the determining unit that the first image patterns can be read, and
   the second-information extracting unit specifies positions of aggregated blocks including bit information of the second information from positions of the first image patterns and the second image patterns specified by the first-information extracting unit at the time of extraction, and extracts information of one bit or a plurality of bits included in the second information for each aggregated block.

9. A method of embedding information comprising:
obtaining image information;
obtaining first information to be embedded in obtained image information;
obtaining second information to be embedded in the obtained image information, the second information having a higher degree of importance than that of the first information;
generating watermark image information including a group of first image patterns and a group of second image patterns, each of which is arranged at each of a plurality of embedding areas, wherein each of the second image patterns is obtained by replacing dots corresponding to one of the first image patterns with dots having an enlarged size, the first image patterns and the second image patterns respectively represent one bit or a plurality of bits that constitute(s) the first information, and sets of the second image patterns respectively represent one bit or a plurality of bits that constitute(s) the second information in such a manner that a positional relationship between the second image patterns in each of the sets represents one bit or a plurality of bits; and
superposing the watermark image information on the obtained image information thereby obtaining watermark-superposed image information.

10. The method according to claim 9, wherein the generating includes:
setting the embedding areas obtained by dividing a display area of the obtained image information in a predetermined size and an aggregated area formed of a plurality of adjacent ones of the embedding areas; and
disposing the second image patterns on one or more of the embedding areas selected according to the second information from the embedding areas forming each of the aggregated areas set at the setting and disposes the first image pattern on one or more of the embedding areas not selected.

11. The method according to claim 9, wherein the generating includes generating the watermark image information formed of the group of first image patterns and the group of the second image patterns in a plurality of types of dot pattern or line pattern.

12. The method according to claim 9, wherein the generating includes generating the watermark image information formed of the group of first image patterns displayed in a dot size smaller than a dot size of a limit of an image reproduction capability of an image processing apparatus and the group of second image patterns displayed in a dot size larger than the dot size of the limit of the image reproduction capability of the image processing apparatus.

13. The method according to claim 9, further comprising performing a printing process on the watermark-superposed image information.

14. The method according to claim 9, wherein the obtaining includes obtaining the image information by scanning a paper document.

15. A computer program product comprising a non-transitory computer-usable medium having a computer program codes which when executed on a computer causes the computer to perform the method according to claim 9.

16. A method of extracting information comprising:
obtaining watermark-superposed image information that is image information having superposed thereon watermark image information formed of a group of first image patterns and a group of second image patterns, each of which is arranged at each of a plurality of embedding areas, wherein each of the second image patterns is obtained by replacing dots constituting corresponding one of the first image patterns with dots having an enlarged size, the first image patterns and the second image patterns respectively represent one bit or a plurality of bits that constitute(s) first information, and sets of the second image patterns respectively represent one bit or a plurality of bits that constitute(s) second information in such a manner that a positional relationship between the second image patterns in each of the sets represents one bit or a plurality of bits;
extracting the first information embedded in the watermark-superposed image information based on the group of the first image patterns and the group of the second image patterns identified from the watermark-superposed image information; and
extracting second information embedded in the watermark-superposed image information based on the positional relationships between the second image patterns identified from the watermark-superposed image information.

17. The method according to claim 16, further comprising determining whether the group of the first image patterns can be read from the watermark-superposed image information, wherein
the extracting first information includes not extracting the first information when it is determined at the determining that the group of the first image patterns cannot be read.

18. The method according to claim 17, further comprising converting the watermark-superposed image information to a predetermined resolution lower than a resolution of the image information, wherein
the extracting second information includes extracting the second information by performing template matching on the image information converted to the predetermined resolution at the converting to identify the positional relationships between the second image patterns.

19. The method according to claim 18, wherein
the extracting first information includes extracting the first information when it is determined at the determining that the first image patterns can be read, and
the extracting second information includes specifying positions of aggregated blocks including bit information of the second information from positions of the first image patterns and the second image patterns specified at the first information extracting at the time of extraction, and extracts information of one bit or a plurality of bits included in the second information for each aggregated block.

20. A computer program product comprising a non-transitory computer-usable medium having a computer program codes which when executed on a computer causes the computer to perform the method according to claim 16.

* * * * *